US006877001B2

(12) United States Patent
Wolf et al.

(10) Patent No.: US 6,877,001 B2
(45) Date of Patent: Apr. 5, 2005

(54) METHOD AND SYSTEM FOR RETRIEVING DOCUMENTS WITH SPOKEN QUERIES

(75) Inventors: Peter P. Wolf, Winchester, MA (US); Bhiksha Ramakrishnan, Watertown, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 515 days.

(21) Appl. No.: 10/132,753

(22) Filed: Apr. 25, 2002

(65) Prior Publication Data

US 2003/0204492 A1 Oct. 30, 2003

(51) Int. Cl.[7] .............................................. G06F 17/30
(52) U.S. Cl. ........................................................ 707/3
(58) Field of Search ........................ 707/10, 1–9, 104.1, 707/200; 704/251, 270.1, 257; 30/432

(56) References Cited

U.S. PATENT DOCUMENTS

| | | | |
|---|---|---|---|
| 6,633,846 B1 | * 10/2003 | Bennett et al. | 704/257 |
| 2002/0022960 A1 | * 2/2002 | Charlesworth et al. | 704/251 |
| 2002/0091527 A1 | * 7/2002 | Shiau | 704/270.1 |
| 2003/0204399 A1 | * 10/2003 | Wolf et al. | 704/251 |
| 2004/0153456 A1 | * 8/2004 | Charnock et al. | 707/10 |

OTHER PUBLICATIONS

Andreas Henrich, "Adapting a spatial access structure for document representations in vector space," Nov. 1996, Proceedings of the fifth international conference on Information and knowledge management, pp. 19–26.*

Evermann et al., "Large vocabulary decoding and confidence estimation using word posterior probabilities," Proceedings of the IEEE international conference on acoustics speech and signal processing, 2000, p. 1–4.

Moreno et al., "A boosting approach to confidence scoring," Proceedings of Eurospeech, 2001, p. 1–4.

* cited by examiner

Primary Examiner—Diane D. Mizrahi
(74) Attorney, Agent, or Firm—Dirk Brinkman; Andrew J. Curtin

(57) ABSTRACT

A system and method indexes and retrieves documents stored in a database. A document feature vector is extracted for each document to be indexed. The feature vector is projected to a low dimension document feature vector, and the documents are indexed according to the low dimension document feature vectors. A spoken query is represented as a lattice indicating possible sequential combinations of words in the spoken query. The lattice is converted to a query certainty vector, which is also projected to a low dimension query certainty vector. The low dimension query vector is compared to each of the low dimension document feature vectors to retrieve a matching result set of documents.

19 Claims, 3 Drawing Sheets

METHOD AND SYSTEM FOR RETRIEVING DOCUMENTS WITH SPOKEN QUERIES

FIELD OF THE INVENTION

The present invention relates generally to indexing and retrieving multi-media content, and more particularly to retrieving multi-media documents from a database using spoken queries.

BACKGROUND OF THE INVENTION

Information Retrieval

The Internet provides worldwide access to a huge number of databases storing publicly available multi-media content and documents. Typically, browsers and search engines executing on desktop systems are used to retrieve the stored documents by having the user specify textual queries or following links. The typed queries typically include key words or phrases. The number of specialized information retrieval (IR) systems are too many to enumerate.

Portable communications devices, such as cellular telephones and personal digital assistants (PDA's), can also be used to access the Internet. However, such devices have limited textual input and output capabilities. For example, keypads of cell phones are not particularly suited for typing input queries, and many PDA's do not have character keys at all. The display screens of these devices are also of a limited size and difficult to read. These types of devices are better suited for speech input and output. A similar situation exists in mobile communication devices that are used to access the Internet from automobiles, such as cars. In this case, it is difficult and dangerous to manually operate the device and to look at a display screen, and a better input and output modality is speech. Therefore, spoken queries provide a better user interface for information retrieval on such mobile devices.

Spoken IR

Prior art document retrieval systems for spoken queries typically use some conventional speech recognition engine to convert a spoken query to a text transcript of the query. The query is then treated as text, and traditional information retrieval processes are used to retrieve pertinent documents that match the query. However, this approach discards valuable information, which can be used to improve the performance of the retrieval system. Most significantly, the entire audio spectral signal that is the spoken query is discarded, and all that remains is the raw text content that has been inferred by the recognizer and is often erroneous.

When either the documents or the query are specified by speech, new techniques must be used to optimize the performance of the system. Techniques used in traditional information retrieval systems that retrieve documents using text queries perform poorly on spoken queries and spoken documents because the text output of speech recognition engine often contains errors. The spoken query often contains ambiguities that could be interpreted many different ways by the recognizer. As a result, the converted text can even contain words that are totally inconsistent within the context of the spoken queries, and mistakes that would be obvious to any listener. Simple text output from the speech recognition engine throws away much valuable information, such as what other words might have been said, or what did the query sound like. The audio signal is usually rich and contains many features such as variations in volume and pitch, and more hard to distinguish features such as stress or emphasis. All this information is lost.

Thus, the basic prior art spoken IR system applies a speech recognizer to a speech signal. The recognized text is then simply fed to a straightforward text-based query system, such as Google or AltaVista.

Speech Recognition

There are many problems with state-of-the-art spoken query based IR systems that simply use a speech recognition system as a speech-to-text translator, as described above. In addition, there is another possibly more important problem. Most speech recognition systems work with pre-defined vocabularies and grammars. The larger the vocabulary, the slower the system, and the more resources, such as memory and processing, required. Large vocabularies also reduce the accuracy of the recognizer. Thus, it is useful to have the vocabulary of the recognizer maintained at a smallest possible size. Typically, this is achieved by identifying a set of words that are most useful for a given application, and restricting the recognizer to that vocabulary. However, small static vocabularies limit the usefulness of an IR system.

A large document index, such as AltaVista, which indexes all words in all documents it finds on the Internet, contains hundreds of millions of words in many languages. A complete vocabulary for AltaVista would be extremely difficult to construct. Other conventional IR systems might not index "stop" words such as "and," and "it," etc. Still, the total number of words indexed in their vocabularies can still run into hundreds of thousands, even for modestly sized indices. For a spoken query based IR system to be effective, all these words must be in the vocabulary of the recognizer. As additional documents are added to the index, the words in that document must be input to the recognizer vocabulary as well. Otherwise, the recognizer would not be capable of recognizing many of the words pertinent to documents in the index. Clearly, conventional recognizers with static vocabularies cannot do this job.

Considering the various problems described above, it is desired to improve information retrieval systems that use spoken queries. In order to mitigate problems due to erroneous recognition by the recognizer, it is desired to retain certainty information of spoken queries while searching for documents that could match the spoken query. Particularly, document retrieval would be improved if the probabilities of what was said or not said were known while searching multi-media databases. In addition, in order to eliminate problems arising from limited, static recognition vocabularies, it is desired to dynamically match the vocabulary of the speech recognizer to the vocabulary of the document index.

SUMMARY OF THE INVENTION

The invention provides a system and method that indexes and retrieves documents stored in a database using spoken queries. A document feature vector is extracted for each document to be indexed. Each feature vector is projected to a low dimension document feature vector, and the documents are indexed in a document index according to the low dimension document feature vectors.

A recognizer represents a spoken query as a lattice, indicating possible sequential combinations of words in the spoken query. The lattice is converted to a query certainty vector, which is projected to a low dimension query certainty vector. The low dimension query vector is compared to each of the low dimension document feature vectors, by a search engine, to retrieve a matching result set of documents.

In addition, an active vocabulary and grammar of the speech recognizer or search engine are dynamically updated with key words and key phrases that are automatically extracted from the documents as they are indexed. In other words, information from the document index is fed back into the recognizer or search engine itself. However, to keep the vocabulary of the recognizer to a minimum, not all words in the documents are included in the vocabulary. Instead, "key words" and "key phrases" in the document are identified, and only these are included in the active vocabulary. Alternatively, the vocabulary can be accessible to the search engine for the purpose of constructing query vectors.

DETAILED DESCRIPTION OF THE PREFERRED EMBODIMENT

Figure 1:
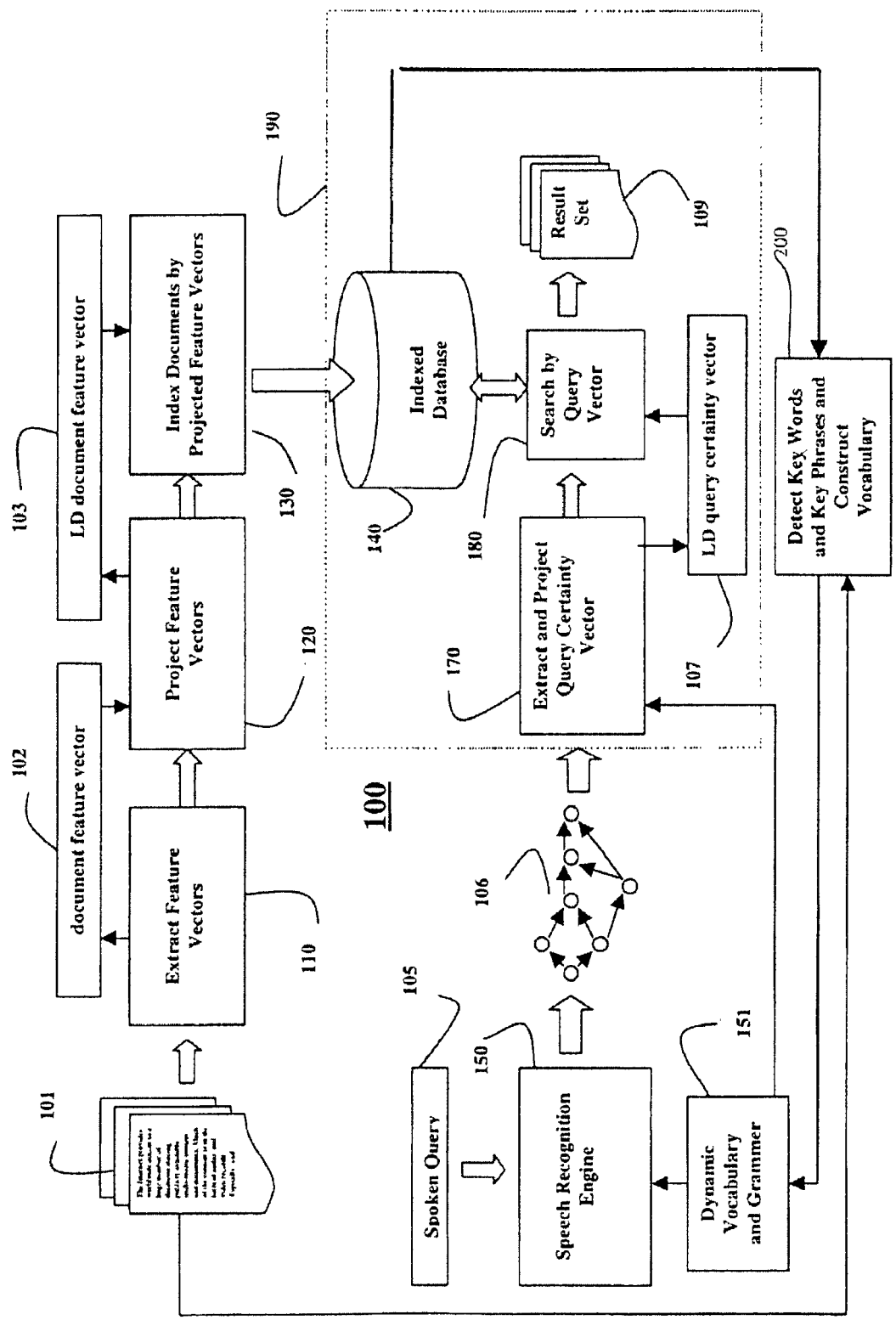
FIG. 1 is a flow diagram of an information retrieval system that uses spoken queries according to the invention.

The invention provides a system and method for retrieving documents from a multi-media database using spoken queries. In addition, the invention makes use of document index information in the speech recognition process, and certainty information about the recognition result while searching for matching documents in the database. The certainty information represents the probabilities of possible query words. This information can be obtained in one of two ways. The invention also can dynamically maintain a dictionary of key words of indexed documents.

In a first way, speech recognition is performed on the query to obtain word-level lattices. A posteriori word probabilities can then be directly determined from the lattice, see e.g., Evermann et al., "*Large vocabulary decoding and confidence estimation using word posterior probabilities,*" Proceedings of the IEEE international conference on acoustics speech and signal processing, 2000.

Alternatively, word confidence scores can be determined using additional classifiers, such as Gaussian mixture classifiers or boosting-based classifiers, see e.g., Moreno et al., "*A boosting approach to confidence scoring,*" Proceedings of Eurospeech, 2001. The classifiers are based on feature representations of words in the lattice that include information represented by the word lattice and additional external information.

Information derived from the word lattice can include features such as the a posteriori probabilities of words, lattice densities in the vicinity of the words, etc. External information used may include lexical information such as the inherent confusability of the words in the lattice, and signal-level information such as spectral features of the audio signal, changes in volume, pitch, etc. External features such as pitch and volume can also be used to determine if some words are more important than others, and to increase the contribution of these words to the retrieval appropriately.

In a second way, speech recognition obtains phoneme-level lattices. The probability of key word or key phrase entries can then be obtained from the phoneme-level lattices. Once again, external acoustic information such as pitch and volume can be used to emphasize or de-emphasize the contribution of phonemes in the estimation of word probabilities. If phonemes are used, then it is possible to handle words that sound the same but have different meaning.

Multi-media documents stored in the database are also indexed according to a model that retains the certainty of the words in the documents that are indexed.

The system and method according to the invention determines and compares feature vectors generated from speech or text. Comparing feature vectors provides a metric for determining the pertinence of documents given a particular spoken query. The metrics are used to retrieve pertinent documents of recorded speech and text, given queries of recorded speech or text.

Indexing Documents Using Low Dimension Feature Vectors

FIG. 1 shows a document indexing and retrieval system 100 according to the invention. Input to the system is documents 101. A document feature vector 102 is determined 110 for each document. The document feature vector 102 is a weighted list of all words in the document. The weight of each word is equal to its frequency of appearance in the document. More frequent words can be considered more important.

If the document being indexed is an audio signal, or other multimedia document where no explicit description of the content is available, and the content is inferred by methods such as speech recognition, then the weight of words in the document feature vector represents the certainty of that word, measured using any of the methods described above.

Next, each document feature vector is projected 120 to a lower dimension to produce a low dimension (LD) document feature vector 103. The projection can use a singular value decomposition (SVD) to convert from a conventional vector space representation to a low dimensional projection. SVD techniques are well known. Alternatively, a latent semantic analysis (LSA) projection can be used. The LSA projection incorporates the inverse document frequency of words, and the entropy of the documents.

Other projective representations are also possible. What is common with all of these techniques is that every document is represented by a low dimension vector of features that appear in the document. The values associated with the words are a measure of the estimated relative importance of that word to the document. A filter can also be applied to ignore common words such as articles, connectors, and prepositions, e.g., "the," "a," "and," and "in." These are commonly called "stop" words. The words to be filtered and ignored can be maintained as a separate list, perhaps editable by the user.

The words can also be "stemmed." Stemming is a process that reduces a word to its basic form, for example, plural nouns are made singular. The various tenses and cases of verbs can be similarly stemmed. Stem words can also be maintained in a user-editable list.

The low dimension document feature vectors 103 are then used to index 130 the documents in a database 140 of a search engine 190. It should be noted that the documents themselves can also be stored in the database 140, or the database can store pointers to the documents. For the purpose of this description, these are considered to be equivalent representations.

In any case, the documents that are indexed can also be used to detect 200 key words that can be used to construct a dynamic vocabulary 151 used by a speech recognizer 150, as described below in greater detail. The key words can be in the form of a sequence of words in a key phrase. The vocabulary 151 can also be part of the search engine 190 so that query vectors 107 be constructed.

Determining Low Dimension Certainty Vectors from Spoken Queries

A spoken query 105 to search 180 the database 140 is processed by the search engine 190 as follows. The spoken query is provided to the speech recognition engine 150. However, instead of converting the spoken query directly to text, as in the prior art, the system according to the invention generates a lattice 106. In the lattice 106, the nodes represent the spoken words, and the directed edges connecting the words represent orders in which the words could have been spoken. Certainty information is retained with the nodes and edges. Generally, the certainty information includes statistical likelihoods or probabilities. Thus, the lattice retains the certainty due to ambiguities in the spoken query.

The lattice 106 represents all likely possible sequential combinations of words that might have been spoken, with associated probability scores. The lattice usually contains most, or all the words that were actually spoken in the query, although they may not appear in the best scoring path through the lattice. The output of a typical prior art speech recognition engine is usually text corresponding to a single best scoring path through the lattice. Because the speech recognition engine often produces errors, not all the words in the hypothesized transcript will always be correct. This may result in the transcript not including words that are crucial to retrieval. On the other hand, the text may contain spurious words, or words converted totally out of context that result in an erroneous retrieval.

In order to compensate for these errors, the invention associates a low dimension certainty vector 107 with every spoken query. Each element of this vector represents a word that might have been spoken, and its value represents the certainty or probability that the word was actually spoken, as well as the order in which the words were spoken.

Figure 3B:
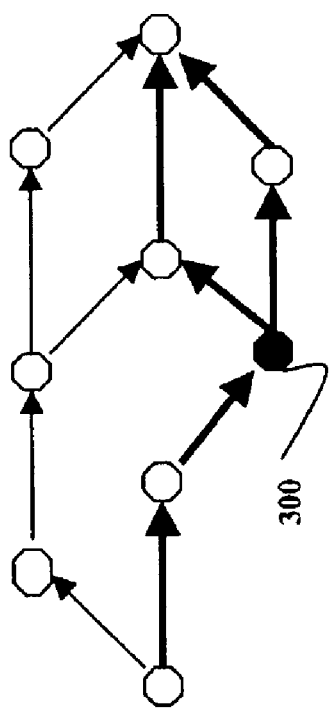
FIGS. 3a–b are diagrams of lattices used by the invention.
Figure 3A:
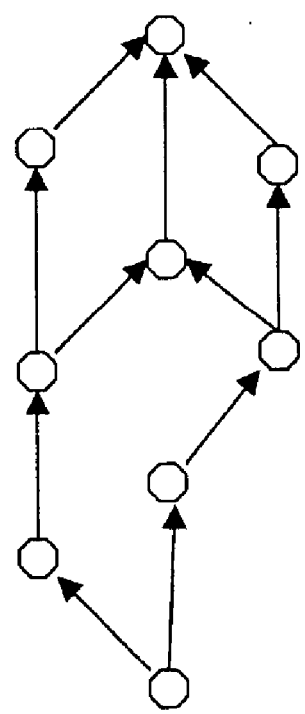

There are several ways of determining 170 the LD query certainty vector 107. FIGS. 3*a–b* show the preferred process. FIG. 3*a* shows all possible paths in a lattice. FIG. 3*b* shows all possible paths through a particular node 300 in bold. By dividing the scores of all paths that pass though the particular node in the lattice by the total likelihood scores of all paths in the lattice, one can determine the probability of every word node in the lattice. This results in a list of all words that might have been said with associated probabilities.

External classifiers that consider various properties of the nodes in the lattice, including frequency scores, such as produced above, can produce the confidences associated with the nodes. Classifier methods include Gaussian classification, boosting based classification, and rule based heuristics based on properties of the lattice. Examples include lattice densities at various points in the lattice. As stated above, the probabilities can also consider other features of the audio signal to determine if certain words are emphasized in the speech. Contextual information can also be used. For example, recognized words that seem out of context can be given lower certainty scores.

The final certainty value for any word is a combination of the confidences or certainties produced by the above methods for all instances of the possible word in the lattice 106.

Every element of the certainty vector is proportional to an estimate of the number of instances of the corresponding word in the document or query. This certainty vector is an analog of the vector space 102 representation of documents 101, and is then subjected to the same projection (SVD, LSA etc.) applied to the document feature vectors 102 to produce the low dimension query certainty vector 107. The low dimension query certainty vector is used to search 180 the database 140 for a result set of documents 109 that satisfy the spoken query 105.

Retrieving Pertinent Documents Using a Spoken Query

Given a spoken query, retrieving the pertinent documents 109 from the database proceeds as follows. typically using the search engine 190. The steps are: use a speech recognizer to map the spoken query to the lattice; determine the set of possible words spoken with associated weights; generate the certainty vector from the set of possible words with associated weight; transform the certainty vector of the spoken query to the optimized low dimension space of the database index; and compare the mapped certainty vector to each mapped document feature vector to obtain a pertinence score. The documents in the result set 109 can then be presented to a user in order of their pertinence scores. Documents with a score less than a predetermined threshold can be discarded.

Constructing Dynamic Recognizer Vocabulary

Detecting Key Words

Document index information utilized in the recognition process can be in the form of key words extracted automatically from the documents to be indexed. In a special case, a sequence of key words is a key phrase. This information is incorporated into the vocabulary and grammar of the recognizer. Key words extraction can be performed in one of many ways, e.g., Tunney, "*Learning to Extract Key phrases from Text*," NRC Technical Report ERB-1057, National Research Council, Canada, 1999.

Many text-based documents come with the key words or phrases already marked. HTML permits the use of the tag <meta>KEYWD</meta> to indicate that a particular word is a key word. Other markup languages provide similar facilities as well. When key words are thus marked, we extract them directly from the document and store them back to the dynamic vocabulary 151 used by the recognizer 150 or the search engine 190.

Figure 2:
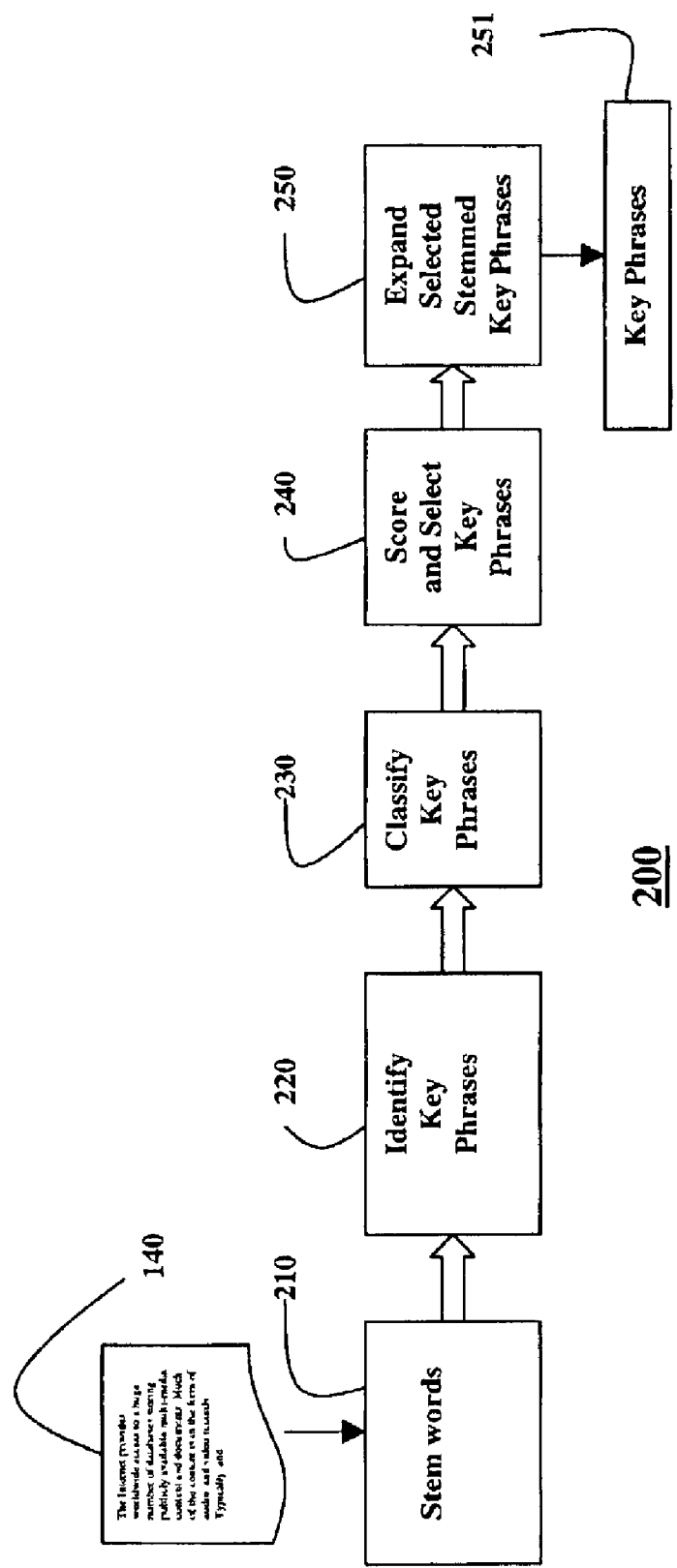
FIG. 2 is a flow diagram of a method for constructing a dynamic speech recognizer vocabulary for an information retrieval system according to the invention.

However, when key words are not marked, they are detected 200 automatically, as shown in FIG. 2. First, the words in the input document 140 are stemmed 210, and all possible key words and key phrases are identified 220. Candidate key phrases are sequences of words, about two to five words long, none of which is a stop word. Each of these is then represented by a vector of features as described above. Features include such values as frequency of occurrence in document, position of first instance in document, etc.

Each of the candidate word or phrase is then classified 230 as key or not. The top N, e.g., N is in the range from 3–10, highest scoring candidates are then selected 240. At this point, the words have all been stemmed. So the selected key words or phrases are also stemmed. They are now expanded 250 to their most frequent unstemmed form 251.

For example, if "speech recognition" and "speech recognizer" both occur in a document. They are both stemmed to "speech recog," which is then classified as key phrase. If "speech recognition" occurred 100 times in the document and "speech recognizer" only 50 times, then "speech recog" is expanded back to "speech recognition" and not to "speech recognizer." In other words, it is expanded to its most frequent unstemmed form.

The classifier 230 can be trained from a tagged corpus of documents. The classifier can have many forms, e.g., rule based, statistical, decision-tree based etc. A typical reference to such methods is Tunney, "*Learning to Extract Keyphrases from Text*," 1999.

Incorporating Key Words into the Recognizer

Key words can be incorporated into the recognizer 150 in two ways. First, the key words can be directly incorporated into the recognizer 150. This solution is useful for situations where the recognizer executes in a computer that has a moderate or large amount of memory and CPU resources. Here, the key words are fed back into the vocabulary 151.

Consequently, every time a new document is introduced into the index 140, the vocabulary of the recognizer dynamically grows by the number of new key words detected in the document. Key phrases are included in the recognizer because it is usually easier to recognize phrases as units, than to recognize individual words in a phrase correctly and then to form proper phrases. The size of the vocabulary can be reduced by incorporating the phrases, not as whole entries, but as valid paths in a "grammar" based on the entries in the vocabulary.

Alternatively, a phoneme lattice, as described above, can also be used for devices with limited resources, e.g., cellular telephones and hand-held digital devices. For this implementation, the recognizer is capable of outputting lattices of phonemes, rather than single hypotheses or lattices of words. In the case where the recognizer is part of the input device, e.g., a cell phone, the lattices can be forwarded to the search engine 190. The search engine 190 scans the received phoneme lattices for all the words or phrases in the vocabulary, and for each identified word, the search engine 190 determines the probability of the word from the probabilities of the component phonemes in the lattice. The computed probabilities are combined with other information, e.g., pitch, stress, etc., as available, to construct query vectors 107.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer-implemented method for indexing and retrieving documents stored in a database, comprising:
   extracting a document feature vector for each of a plurality of documents;
   projecting each document feature vector to a low dimension document feature vector;
   indexing each of the plurality of documents according the associated low dimension document feature vector in the database;
   representing a spoken query as a lattice, the lattice representing likely possible sequential combinations of words in the spoken query;
   converting the lattice to a query certainty vector;
   projecting the query certainty vector to an associated low dimension query certainty vector;
   comparing the low dimension query vector to each of the low dimension document feature vectors; and
   retrieving a result set of documents from the database that have low dimension document feature vectors that match the low dimension query certainty vector.

2. The computer-implemented method of claim 1 wherein the document feature vector is a weighted list of all words in each document.

3. The computer-implemented method of claim 2 wherein the weight of each word is equal to a frequency of appearance of the word in the document.

4. The computer-implemented method of claim 1 wherein the projecting uses a singular value decomposition.

5. The computer-implemented method of claim 1 wherein the projecting uses a latent semantic analysis.

6. The computer-implemented method of claim 1 further comprising:
   filtering common words from the document feature vector.

7. The computer-implemented method of claim 1 wherein the lattice includes nodes and directed edges, the nodes representing spoken words, and the directed edges connecting the nodes representing possible orders in which the words could have been spoken.

8. The computer-implemented method of claim 7 further comprising:
   associating confidence scores with the nodes and the directed edges.

9. The computer-implemented method of claim 8 wherein a Gaussian classifier is used to determine the confidence scores.

10. The computer-implemented method of claim 8 wherein a boosting based classifier is used to determine the confidence scores.

11. The computer-implemented method of claim 8 wherein the confidence scores are derived from rule based heuristics.

12. The computer-implemented method of claim 8 wherein the confidence scores are based on features of an audio signal of the spoken query.

13. The computer-implemented method of claim 12 wherein the audio features include volume and pitch.

14. The computer-implemented method of claim 1 wherein the documents of the result set are in an order of pertinence scores of the documents.

15. The computer-implemented method of claim 1 wherein the documents include multi-media content.

16. The computer-implemented method of claim 1 wherein the lattice includes nodes and directed edges, the nodes representing phonemes, and the directed edges connecting the nodes representing possible orders in which the phonemes could have been spoken.

17. The computer-implemented method of claim 7 further comprising:
   stemming the words.

18. The computer-implemented method of claim 1 further comprising:
   dynamically constructing a vocabulary for a speech recognizer used to recognize the spoken query from key words extracted from each document.

19. A computer-implemented system for indexing and retrieving documents in a database, comprising:
   means for extracting a document feature vector for each of a plurality of documents;
   means for projecting each document feature vector to a low dimension document feature vector;
   a database indexing each of the plurality of documents according the associated low dimension document feature vector;
   means for representing a spoken query as a lattice, the lattice representing likely possible sequential combinations of words in the spoken query;
   means for converting the lattice to a query certainty vector;
   means for projecting each query certainty vector to an associated low dimension query certainty vector;
   means for comparing the low dimension query vector to each of the low dimension document feature vectors; and
   a search engine configured to retrieve a result set of documents from the database that have low dimension document feature vectors that match the low dimension query certainty vector.

* * * * *